United States Patent
Nicholson et al.

(10) Patent No.: US 9,232,201 B2
(45) Date of Patent: Jan. 5, 2016

(54) DYNAMIC PROJECTED IMAGE COLOR CORRECTION BASED ON PROJECTED SURFACE COLORATION

(71) Applicant: LENOVO (SINGAPORE) PTE. LTD., New Tech Park (SG)

(72) Inventors: John Weldon Nicholson, Cary, NC (US); Howard Jeffrey Locker, Cary, NC (US); Aaron Michael Stewart, Raleigh, NC (US); Michaela Rose Case, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 145 days.

(21) Appl. No.: 14/143,715

(22) Filed: Dec. 30, 2013

(65) Prior Publication Data

US 2015/0189247 A1 Jul. 2, 2015

(51) Int. Cl.
*G03B 21/14* (2006.01)
*H04N 9/31* (2006.01)

(52) U.S. Cl.
CPC ........... *H04N 9/3182* (2013.01); *H04N 9/3194* (2013.01); *H04N 9/3185* (2013.01); *H04N 9/3197* (2013.01)

(58) Field of Classification Search
CPC . H04N 9/3182; H04N 9/3185; H04N 9/3194; H04N 9/3197
USPC .................. 353/30, 31, 69, 70; 348/743–747
See application file for complete search history.

(56) References Cited

U.S. PATENT DOCUMENTS

| | | | | |
|---|---|---|---|---|
| 5,796,425 A | * | 8/1998 | Minami | H04N 9/3182 348/181 |
| 2003/0210381 A1 | * | 11/2003 | Itaki | 353/70 |
| 2004/0140982 A1 | * | 7/2004 | Pate | H04N 9/3182 345/600 |
| 2005/0001986 A1 | * | 1/2005 | Matsuda | 353/31 |
| 2006/0152682 A1 | * | 7/2006 | Matsuda et al. | 353/40 |
| 2007/0154086 A1 | * | 7/2007 | Cho et al. | 382/162 |
| 2010/0201894 A1 | * | 8/2010 | Nakayama et al. | 348/745 |

OTHER PUBLICATIONS

Chang-Hwan Son, Yeong-Ho Ha, "Color Correction of Images Projected on a Colored Screen for Mobile Beam Projector", May-Jun. 2008, School of Electrical Engineering and Computer Science, Kyungpook National University, Korea.
"Image Sensor", Wikipedia, the free encyclopedia, Retrieved on Dec. 17, 2013 from http://en.wikipedia.org/wiki/Image_sensor#Color_separation.
"Color Correction Matrix", Imatest. Retrieved on Dec. 17, 2013 from http://www.imatest.com/docs/colormatrix/.
"Background Color Compensator (BCC)", QuickLogic. Retrieved on Dec. 13, 2013 from http://www.quicklogic.com/technologies/bcc/overview/.

(Continued)

*Primary Examiner* — Sultan Chowdhury
(74) *Attorney, Agent, or Firm* — John L. Rogitz; John M. Rogitz (57) ABSTRACT

The color of a projected image is dynamically corrected by sensing the color of the surface onto which the image is projected before the image is projected, and/or sensing the color of the surface between frames of the projected image, and/or by sensing the projected image as it is displayed on the surface and comparing what is sensed to the original image. Corrections to the color of the projected image are then made based on the sensed information from the surface onto which the image is projected.

20 Claims, 4 Drawing Sheets

(56) References Cited

OTHER PUBLICATIONS

Dae-Chul Kim, Tae-Hyoung Lee, Ho-Gun Ha, Yeong-Ho Ha, "Color Correction Using a Still Camera for Images Projected onto a Light Colored Screen", Mar. 18, 2011, School of Electronics Engineering, Kyungpook National University, Korea.

"Samsung Galaxy Beam Combines Android smartphone and Pico projector", SlashGear. Retrieved on Dec. 17, 2013 from http://www.slashgear.com/samsung-galaxy-beam-combines-android-smartphone-and-pico-projector-25215298/.

Brad Molen, "Alcatel OneTouch intros prototype pico projector docking port (hands-on)", Engadget. Retrieved on Dec. 17, 2013 from http://ww.engadget.com/2013/09/05/alcatel-onetouch-pico-projector/.

"Top 10 Pico Projectors", Projector Centraol. Retrieved on Dec. 17, 2013 from http://www.projectorcentral.com/popular-pico-projectors.htm.

"Microvision:Technology", Microvision. Retrieved on Dec. 17, 2013 from http://www.microvision.com/technology/index.html.

"Pico Projector Solutions", QuickLogic. Retrieved on Dec. 17, 2013 from http://www.quicklogic.com/solutions/application/pico-projector/overview/.

\* cited by examiner

DYNAMIC PROJECTED IMAGE COLOR CORRECTION BASED ON PROJECTED SURFACE COLORATION

FIELD

The present application relates generally to dynamically correcting projected image color based on projected surface coloration.

BACKGROUND

Displays using projection technology are growing in use, with some types being incorporated into smart phones, tablet computers, wearable augmented reality devices, and the like. As understood herein, the burgeoning new uses mean that projection technology increasingly is used on non-conventional display surfaces such as human hands, patterned surfaces, etc., and projecting images onto such surface can make the images look incorrect.

SUMMARY

Accordingly, in a first aspect an apparatus includes a processor and a memory accessible to the processor. The memory bears instructions executable by the processor to receive from a light sensor a sensed correction input generated by light reflected off a surface. Based on the sensed correction input, the processor alters a color of at least one image to be projected by an image projector onto the surface.

In another aspect, a method includes sensing a color of the surface onto which an image is to be projected to render a detected surface color, and based at least in part on the detected surface color, dynamically altering a color of a projected image.

In another aspect, an apparatus includes a processor and a light sensor which receives reflections from a surface and provides signals representing the reflections to the processor. The apparatus also includes an image projector which projects images onto the surface under control of the processor. A memory is accessible to the processor and bears instructions executable by the processor to receive from the light sensor the signals, and based at least in part on the signals, alter at least one color of at least one image to be projected onto the surface by the image projector.

The details of present principles, both as to their structure and operation, can best be understood in reference to the accompanying drawings, in which like reference numerals refer to like parts, and in which:

DETAILED DESCRIPTION

This disclosure relates generally to device based user information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktop, laptop, and tablet computers, and other hand held devices including e.g. smart phones. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various subroutines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
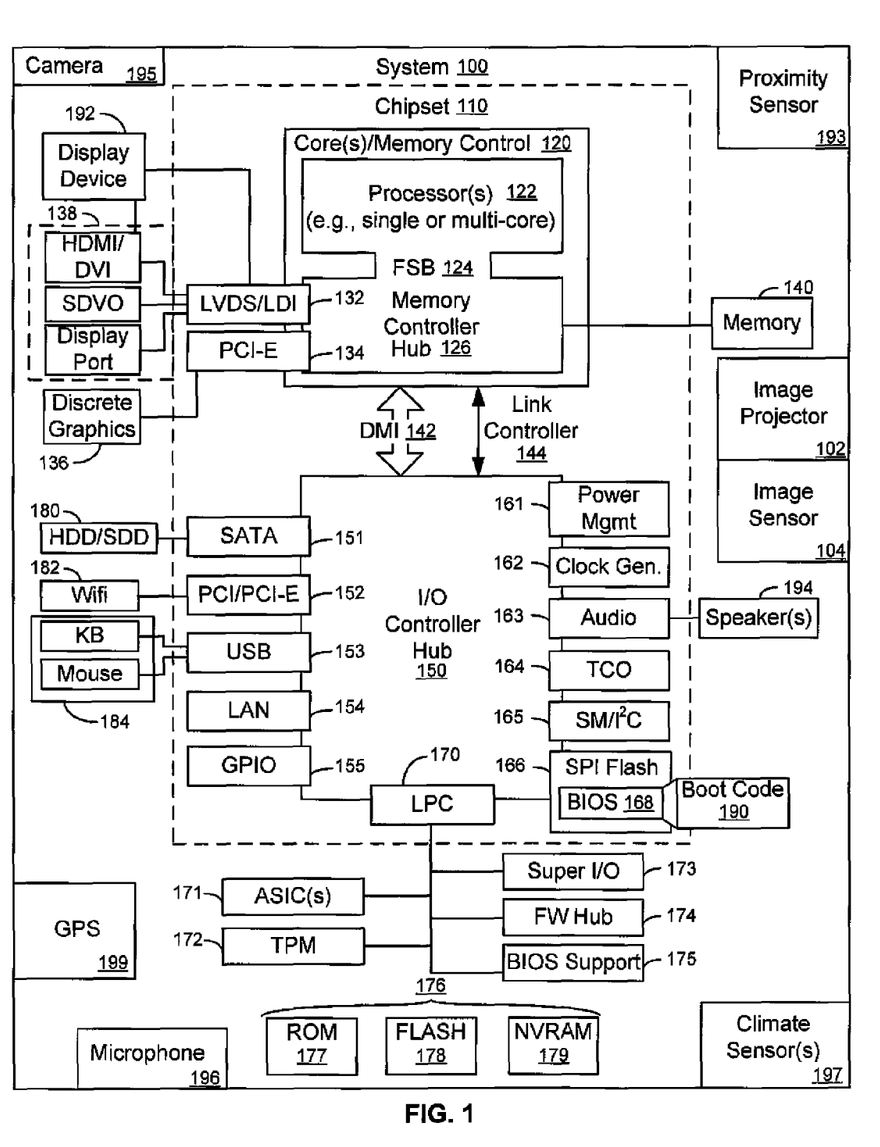
FIG. 1 is a block diagram of an exemplary device in accordance with present principles.

Now in reference to FIG. 1, it shows an exemplary block diagram of an exemplary computer system 100 such as e.g. an Internet enabled, computerized telephone (e.g. a smart phone), a tablet computer, a notebook or desktop computer, an Internet enabled computerized wearable device such as a smart watch, a computerized television (TV) such as a smart TV, so-called "convertible" devices such as e.g. a tablet that may be converted to a laptop by virtue of being connected to a soft keyboard, and/or other smart devices, etc. Thus, in some embodiments the system 100 may be a desktop computer system, such as one of the ThinkCentre® or a notebook computer, such as the ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture. The processor 122 may control one or more image projectors 102 to project images onto a projection surface, and the processor 122 may receive input from an image sensor 104 representing images reflected from the surface, and more particularly representing colors in images reflected from the surface. Without limitation the image sensor 104 may include a charge coupled device (CCD) and/or complementary metal-oxide semiconductor (CMOS).

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including e.g. one of more GPUs). An exemplary system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 also may include sensors and/or a sensor array including e.g. a proximity, infrared, sonar, and/or heat sensor 193 providing input to the processor 122 and configured for sensing e.g. body heat of a person and/or the proximity of at least a portion of the person to at least a portion of the system 100 such as the sensor 193 itself. Also in some embodiments, the system 100 may include one or more cameras 195 providing input to the processor 122. The camera 195 may be, e.g., a thermal imaging camera, a digital camera such as a webcam, and/or a camera integrated into the system 100 and controllable by the processor 122 to gather pictures/images and/or video in accordance with present principles. Moreover, the system 100 may include an audio receiver/microphone (e.g. a microphone or microphone array) 196 for e.g. entering input such as a command to the system 100.

In addition to the foregoing, the system 100 may include one or more climate sensors 197 (such as e.g., an (e.g. ambient) light sensor, a temperature sensor, a humidity sensor, and/or an environmental sensor) providing input to the processor 122 in accordance with present principles. The system 100 may also include one or more motion sensors 198 (such as e.g., an accelerometer and/or a gesture sensor (e.g. for sensing gestures in free space associated by the device with commands, etc.) providing input to the processor 122. Though not shown, still other sensors may be included and their output used in accordance with present principles, such as e.g. biometric sensors, sound sensors, orientation sensors, location sensors, scan sensors, and/or time sensors. Also note that a GPS transceiver 199 is shown that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
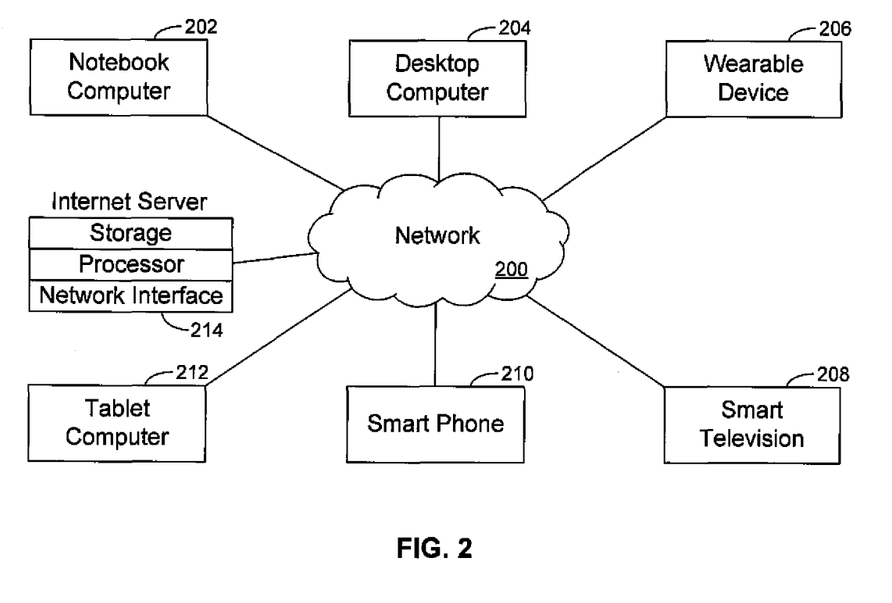
FIG. 2 is a block diagram of a network of devices in accordance with present principles.

Before moving on to FIG. 2 and as described herein, it is to be understood that an exemplary device or other machine/computer may include fewer or more features than shown on the system 100 of FIG. 1. In any case, it is to be understood at least based on the foregoing that the system 100 is configured to undertake present principles.

Turning now to FIG. 2, it shows exemplary devices communicating over a network 200 such as e.g. the Internet in accordance with present principles is shown. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 2120, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
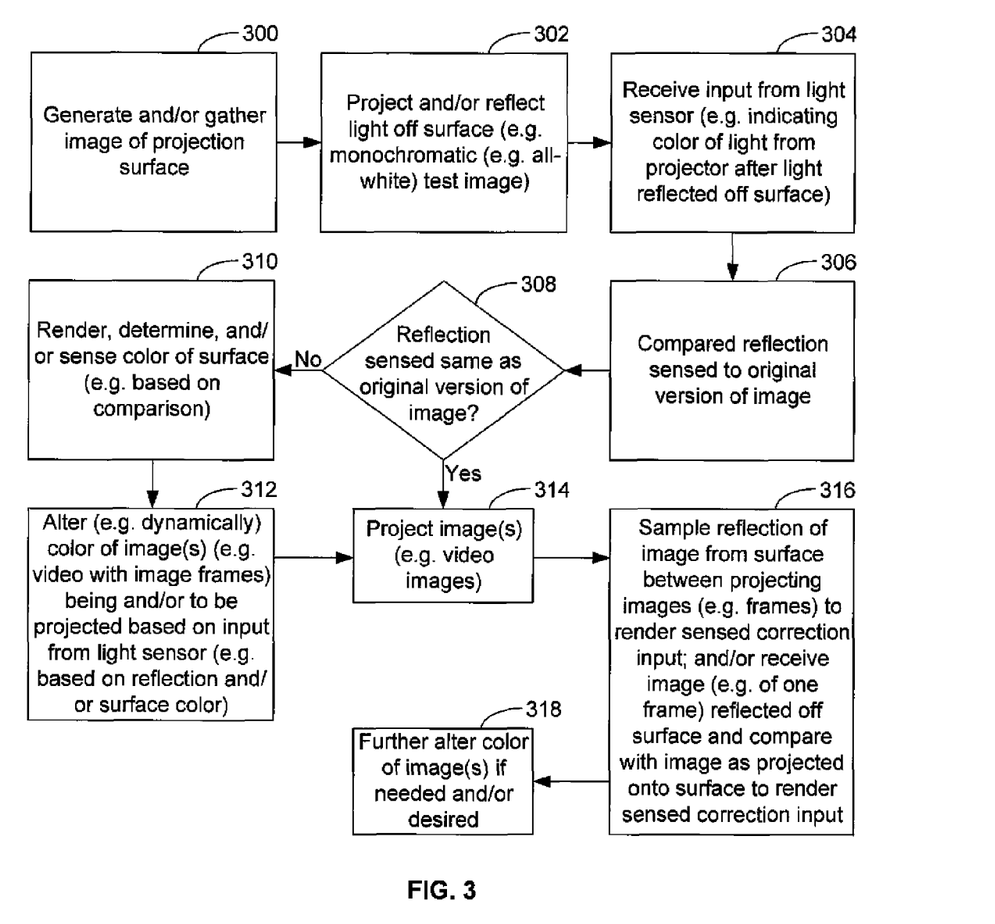
FIG. 3 is an exemplary flow chart of logic to be executed by a device in accordance with present principles.

FIG. 3 illustrates logic that may be executed by any of the foregoing devices. Beginning at block 300, the logic (e.g. optionally and/or in some embodiments) generates and/or gathers an image of a surface on which images are to be projected e.g. using a camera and/or light sensor in accordance with present principles (e.g. to thus sense one or more colors of the surface). The logic then proceeds to block 302 where the logic projects and/or reflects light off of the surface. In some embodiments, the projected and/or reflected light may be a test image such as a monochromatic test image, and/or also in some embodiments the test image may be white (e.g., all white) to assist with sensing the color of the surface (e.g. in varying embodiments, in addition to or in lieu of sensing the color of the surface such as e.g. at block 300).

The logic of FIG. 3 then continues from block 302 to block 304, where the logic receives input (e.g. a sensed correction input in accordance with present principles) from a light sensor that e.g. indicates the color of light from the projector after the light is reflected off of the surface (e.g. and/or that may also indicate the color of the surface). Thereafter, the logic proceeds to block 306 where the logic compares the reflection sensed and/or received at block 304 to an original version of the image. The logic then proceeds to decision diamond 308, where the logic determines whether the reflection sensed and/or received is the same as the original version of the image (e.g., the same (or e.g. substantially the same) colors for respective pixel areas and/or portions on both of the images). Responsive to an affirmative determination at diamond 308, the logic proceeds to block 314, which will be described shortly. However, a negative determination at diamond 308 instead causes the logic to proceed to block 310, where the logic renders, determines, and/or senses one or more colors of (e.g. differing and/or various portions of) the surface at least partially based on the comparison.

From block 310 the logic proceeds to block 312, where the logic alters (e.g. dynamically) one or more colors of at least one image (e.g. in some embodiments, video with plural image frames) being and/or to be projected (e.g. by an image projector based on input from the light sensor and/or camera in accordance with present principles). Thus, it is to be understood that in some embodiments, one or more color(s) of the image may be altered (and hence e.g. various portions or areas of the image itself) based on the reflection and/or surface color sensed. The logic then proceeds to block 314, it being understood as noted above that an affirmative determination at diamond 308 causes the logic to directly move to block 314. In any case, at block 314 the logic projects one or more images such as video images onto the surface e.g. with one or more color alterations as may have been done at block 312.

FIG. 3 then continues to block 316. At block 316, the logic may sample a reflection of one or more image(s) (e.g., video if such is projected at block 314) from the surface between projecting at least two images and/or image frames of video to render a sensed correction input (e.g. and/or to determine the color of the surface). In addition to or in lieu of the foregoing sentence, at block 316 the logic may receive an image (e.g. of at least one frame of the video) reflected off the surface and compare the image (e.g. of the at least one frame) reflected off the surface with the (e.g. corresponding and/or respective) at least one image (e.g., frame) as projected (and/or as in original form and/or coloring) to render a sensed correction input (e.g. and/or to determine the color of the surface). The logic may then conclude at block 318 where the logic may further alter the color of the image(s) being projected or to be projected (e.g. if desired) based on what occurs at block 316 (e.g. based on the sensed correction input that is rendered thereat).

Figure 4:
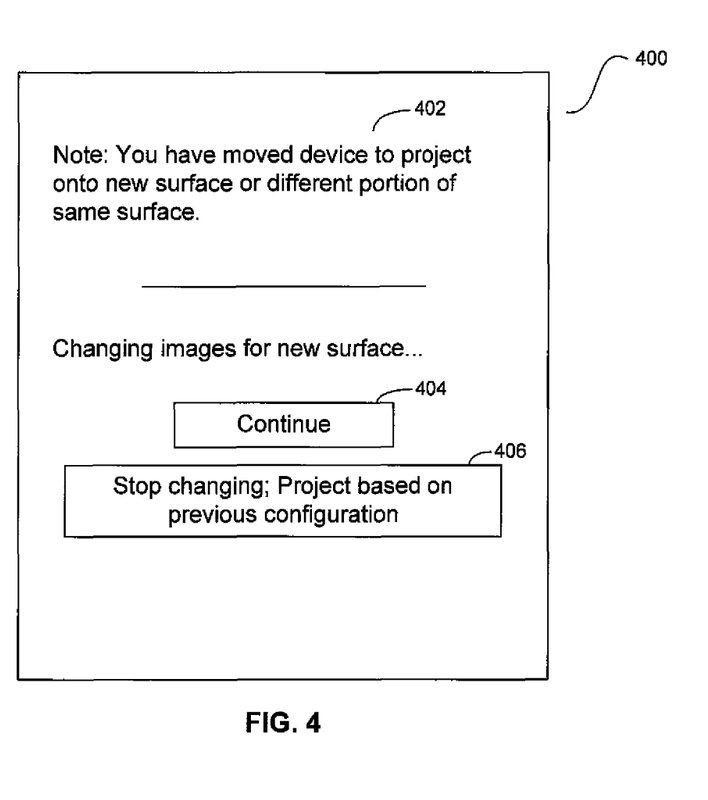
FIG. 4 is an exemplary user interface (UI) presentable on a device in accordance with present principles.

Continuing the detailed description in reference to FIG. 4, it shows an exemplary user interface (UI) 400 presentable on a display of a device such as the system 100 in accordance with present principles. The UI 400 includes an indication 402 that may indicate e.g. that the user has moved the projector (and/or device presenting the UI 400 if also projecting the image(s) e.g. using a projector thereon) to project the image(s) onto a different and/or new surface, and/or at least one different portion of a previously used projection surface e.g. in the middle of projecting images of a video file. Note that sensing whether the projector and/or device has been moved to project images onto at least one new portion of a surface may be done e.g. based on input from an accelerometer on the projector and/or device detecting an acceleration, based on motion as detected from another motion sensor, based on the device determining that the GPS coordinates of the projector and/or device have changed, and/or based on the device detecting that the surface it is to project images onto has changed (e.g. the color has changed, the depth and/or distance from the projector and/or image has changed, etc.) based on signals from a camera and/or proximity sensor, etc.

The indication 402 may also indicate that the device and/or projector is (e.g. currently) changing the color of the images for projecting onto the new and/or (e.g. at least somewhat) different surface. Thus, a continue selector element 404 is shown that is selectable to automatically without further user input command the device to continue changing images when a new surface and/or somewhat different surface is detected. Note also that a stop selector element 406 is also shown for selection by a user to automatically without further user input command the device to stop changing the colors of images being projected (e.g. at least during the current image-projecting instance and/or session, and/or for all instances and sessions until contrary user input is received) even if a new and/or different surface is detected.

Concluding the description of FIG. 4, also note that at least some of the information in the indication 402 may be (e.g. in addition to or in lieu of being presented on a display of a device) presented as a projected image on the projection surface e.g. before, during, and/or after adjusting the color(s) of the projected image based on the color(s) of the surface in accordance with present principles.

Without reference to any particular figure, it is to be understood that color correction in accordance with present principles (e.g. changing the color of an image based on the sensed color of the surface) may be determined using the following exemplary algorithm. E.g., Desired image=Projected image×transformation matrix. The images may have the form of a (rows×columns) by three matrix. The transformation matrix may have the form of a three by three matrix.

Sometimes, this may also be done with a differential correction or constant correction, which may make the equation: Desired image=(Projected image; 1)×transformation matrix. Note that in such an instance, the transformation may be a three by four matrix.

Moreover, the first step may be determining the transformation matrix. This may involve using the sensed values to build the matrix, where the matrix is to be found and/or solved for in accordance with present principles, and may be an iterative procedure.

The second step may be determining what the projected image is to be. This may involve inverting the transformation matrix as follows: Desired image×Inverse(Transformation matrix)=Projected image.

It is to be understood that undertaking the foregoing based on a per-pixel level may involve using the same algorithms save for e.g. determining the transformation parameters on finer resolution scales.

Continuing the detailed description still without reference to any particular figure, it is to be understood in accordance with present principles that a camera may thus gather an image of a projection surface, and a device receiving the image may identify one or more colors contained therein, and segment parts of the projected image and/or surface e.g. on a per-pixel level. Then, each pixel may be averaged across pixel equivalents (using e.g. one or more hardware sensors) and adjacent ones respond e.g. only to certain colors.

Also note that Pico projectors may be used in accordance with present principles.

Based on the foregoing, it may now be appreciated that the present application deals in particular with the use of a colored projection surface. When projecting onto a non-white surface (such as a hand) or a patterned surface (such as a poster or wallpaper) the projected image will look correct by undertaking present principles.

More specifically, this application provides systems and methods for correcting the color content of the projected image based on the coloration of the projection surface. This may be done in at least one or more of the following ways, which may be taken in isolation or combined with each other. The first way is by sensing the color of the projection surface before the projected image is shown (e.g. initially before projecting any image e.g. during the projection instance and/or session). This may involve taking a picture of the surface, e.g. either with the projector off or with the projector showing an all-white image.

The second way is interleaving sensing of the projection surface coloration between frames of the projected image. This may in some instances and respects involve at least some of the same procedure as the first way above, but with the sensing being repeated periodically such as e.g. when a timer expires for a time threshold and/or when motion is detected (e.g. by a motion sensor and/or a camera).

The third way is sensing the projected image (e.g. as reflected) and comparing it with the original image. This is a way to determine how different the resultant projection may be from the intended and/or original projection.

This application thus makes use of systems and methods for adjusting the coloration of the projected image so that it appears "correct" to the user and/or as intended on the projection surface. As but one more example, e.g. suppose images are being projected onto a red surface and that the user wants the image to look white. Light will be projected that is cyan (e.g. green+blue). When this light hits the red surface, it will look white to the user.

Present principles further recognize that although e.g. a software application for undertaking present principles may be vended with a device such as the system 100, it is to be understood that present principles apply in instances where such an application is e.g. downloaded from a server to a device over a network such as the Internet.

While the particular DYNAMIC PROJECTED IMAGE COLOR CORRECTION BASED ON PROJECTED SURFACE COLORATION is herein shown and described in detail, it is to be understood that the subject matter which is encompassed by the present application is limited only by the claims.

What is claimed is:

1. An apparatus, comprising:
 a processor;
 storage accessible to the processor and bearing instructions executable by the processor to:
 receive from a light sensor input generated at least in part based on light reflected off a surface;
 based at least in part on the input, alter a color of at least one image to be projected by an image projector onto the surface;
 project at least one image onto the surface at least in part using the image projector;

based at least in part on data from at least a first sensor, determine that the apparatus has undergone movement; and in response to the determination that the apparatus has undergone movement; determine whether to alter a color of at least one additional image to be projected by the image projector.

2. The apparatus of claim 1, wherein the at least first sensor comprises one or more of: a motion sensor, a global positioning system (GPS) receiver, and a proximity sensor.

3. The apparatus of claim 1, wherein the determination of whether to alter a color of at least one additional image to be projected by the image projector is executed at least in part based on receipt, from the light sensor and subsequent to the movement, of input generated at least in part based on light reflected off at least one surface.

4. The apparatus of claim 3, wherein the determination of whether to alter a color of at least one additional image to be projected by the image projector is executed during projection of images.

5. The apparatus of claim 1, wherein the instructions are executable to:

in response to the determination that the apparatus has undergone movement, determine a least one color alteration for the at least one additional image.

6. The apparatus of claim 1, wherein the instructions are executable to:

in response to the determination that the apparatus has undergone movement, present an indication that at least one color alteration is being determined for at least one additional image to be projected by the image projector.

7. The apparatus of claim 6, wherein the indication is presented using the image projector.

8. The apparatus of claim 6, comprising a display accessible to the processor, wherein the indication is presented on the display.

9. A method, comprising:

using a device; sensing a color of a surface onto which an image is to be projected to render a detected surface color;

based at least in part on the detected surface color, dynamically altering at least one respective color for each of plural images to be projected;

projecting plural images, the plural projected images respectively having at least one color dynamically altered based at least in part on the detected surface color;

sensing movement of the device;

at least in part responsive to sensing the movement sampling a reflection from the surface of at least one of the plural projected images between projecting two of the plural projected images; and at least in part based on the sampling of the reflection, determining whether to dynamically alter a color of at least one additional image to be projected.

10. The method of claim 9, wherein the sampling of the reflection is a sampling of a first reflection, and wherein the method comprises:

in response to expiration of a threshold time, sampling a second reflection from the surface of at least one of the plural projected images while projecting the plural projected images; and at least in part based on the sampling of the second reflection, determining whether to dynamically alter a color of at least one additional image to be projected.

11. The method of claim 9, wherein the sensing of movement of the device is executed at least in part based on data from one or more of: a motion sensor, and a proximity sensor.

12. An apparatus, comprising:

a processor;

a light sensor which receives reflections from a surface and provides signals representing the reflections to the processor;

an image projector which projects images onto the surface under control of the processor; and storage accessible to the processor and bearing instructions executable by the processor to:

receive from the light sensor at least one signal;

based at least in part on the at least one signal from the light sensor, determine at least a first alteration to at least one color of at least one image to be projected onto the surface by the image projector;

based at least in part on data from at least a first sensor, determine that the apparatus has undergone movement; and in response to the determination that the apparatus has undergone movement, determine at least a second alteration to at least one color of at least one image to be projected by the image projector.

13. The apparatus of claim 12, comprising a motion sensor accessible to the processor, wherein the at least first sensor comprises the motion sensor.

14. The apparatus of claim 12, comprising a global positioning system (GPS) receiver accessible to the processor, wherein the at least first sensor comprises the GPS receiver.

15. The apparatus of claim 12, comprising a proximity sensor accessible to the processor, wherein the at least first sensor comprises the proximity sensor.

16. The apparatus of claim 12, wherein the at least first sensor comprises the light sensor.

17. The apparatus of claim 12, wherein the instructions are executable to:

alter, per the first alteration, at least one color of at least one image to be projected onto the surface by the image projector; and alter, per the second alteration, at least one color of at least one image to be projected onto the surface by the image projector.

18. The apparatus of claim 12, wherein the instructions are executable to:

in response to the determination that the apparatus has undergone movement, present an indication that at least one color alteration is being determined for at least one image to be projected by the image projector.

19. The apparatus of claim 18, wherein the indication is presented using the image projector.

20. The apparatus of claim 18, comprising a display accessible to the processor, wherein the indication is presented on the display.

* * * * *